United States Patent [19]

Dewey

[11] 3,729,670
[45] Apr. 24, 1973

[54] REDUNDANT TRIGGERING MEANS FOR HVDC VALVE

[75] Inventor: Clyde G. Dewey, Drexel Hill, Pa.

[73] Assignee: General Electric Company, Philadelphia, Pa.

[22] Filed: Feb. 12, 1971

[21] Appl. No.: 114,948

[52] U.S. Cl.................321/11, 307/219, 307/252 L, 307/252 Q
[51] Int. Cl. .......................H02m 1/18, H03k 17/00
[58] Field of Search ...........................321/11, 27 R; 307/204, 219, 252 L, 252 Q, 311

[56] References Cited

UNITED STATES PATENTS

| 3,599,075 | 8/1971 | Etter et al. | 321/11 |
| 3,626,271 | 12/1971 | Dewey | 321/11 |
| 3,386,027 | 5/1968 | Kilgore et al. | 321/11 |
| 3,412,312 | 11/1968 | Rice | 321/11 |
| 3,487,261 | 12/1969 | Boksjo et al. | 321/11 X |

FOREIGN PATENTS OR APPLICATIONS

| 1,298,103 | 5/1962 | France | 321/11 |
| 1,469,585 | 1/1967 | France | 307/252 L |

Primary Examiner—William H. Beha, Jr.
Attorney—J. Wesley Haubner and Albert S. Richardson, Jr.

[57] ABSTRACT

A redundant triggering scheme is disclosed for an electric valve composed of switching matrices each comprising plural serially connected thyristors and a serially connected current limiting inductor. Means are provided coupled to said inductors for providing redundant trigger signals to a matrices' thyristors in response to the initiation of current flow through on inductors of another matrix.

3 Claims, 2 Drawing Figures

Patented April 24, 1973

3,729,670

INVENTOR:
CLYDE G. DEWEY,
BY Barry G. Stein
ATTORNEY

3,729,670

REDUNDANT TRIGGERING MEANS FOR HVDC VALVE

BACKGROUND AND OBJECTS OF THE INVENTION

My invention relates generally to voltage, electric valves which are composed of a plurality of triggerable semiconductor rectifiers and more particularly it relates to redundant triggering means therefor.

In modern practice electric power converters (e.g., rectifiers, inverters) advantageously employ solid-state electric valves comprising coordinated arrays of semiconductor switching devices which will hereinafter be referred to as thyristors (also known generally as silicon controlled rectifiers or SCR's). Typically six such valves are arranged in a three-phase double-way bridge configuration having three separate A-C terminals and a set of positive and negative D-C terminals. By sequentially firing the six valves in proper order and in timed relationship with the voltage of the three-phase electric power system to which the A-C terminals are connected, the flow of power between the A-C and D-C terminals can be controlled as desired.

Owing to the fact that individual thyristors commercially available today have current ratings that may be inadequate to meet the needs of high-power converters, several of these devices are connected in parallel with one another to form a higher current "thyristor section." Further, owing to the fact that the maximum forward and reverse blocking voltage ratings of commercially available SCR's are still much lower than required for very high voltage applications, a plurality of series thyristor sections are utilized in each valve.

As is known in the art, when connected to a source of voltage and a load, a thyristor will ordinarily block appreciable current flow between its anode and cathode until triggered or "fired" by the application thereto of a control signal (gate pulse) above a small threshold value at a time when the anode voltage is positive with respect to the cathode, whereupon it abruptly switches to a conducting state. Therefore, thyristor-composed-electric valves are provided with triggering means for controlling current conduction therethrough.

The construction of a solid state electric valve may take many forms. In one form at least one pair of serially connected thyristors and the protective circuitry therefor are grouped together to form what can be denoted as a "switching matrix," and a plurality of such matrices may be connected in series with one another to form the valve. In my U.S. patent 3,423,664 and my U.S. Pat. application Ser. No. 888,432 filed on Dec. 29, 1969 now U.S. Pat. No. 3,626,271, both assigned to the same assignee as my instant invention, there are disclosed and claimed novel switching matrices adapted for connection with one another to form high voltage electric converter valves.

To effectuate proper operation of a valve constructed of plural matrices, the thyristors of all of the matrices should be rendered conductive in unison. In systems utilizing separate triggering means for each matrix, simultaneous operation of those means is required. In my above mentioned patent there is shown separate triggering means for each of the switching matrices making up the converter valve. Such means are arranged for simultaneous operation in accordance with the teachings of U.S. Pat. No. 3,355,600 (Mapham) assigned to the same assignee as my instant invention.

In any triggering system using individual, simultaneously operable triggering means for each switching matrix, in the abnormal event that a triggering means for a matrix fails to trigger the thyristors of that matrix into conduction when called upon to do so, the entire valve might fail to conduct, notwithstanding that the thyristors of the other matrices would have been triggered. Accordingly, in the interests of operating reliability it is desirable to provide a redundant firing system for the thyristors of a plural-switching-matrix composed electric valve.

It is thus an object of my invention to provide a redundant firing system for the thyristors of a plural switching-matrix composed electric valve.

It is a further object of my invention to provide a relatively simple and economical redundant firing system for the thyristors of a plural-switching-matrix-composed electric valve.

SUMMARY OF THE INVENTION

A redundant triggering system is provided for a high voltage solid state converter valve consisting of a plurality of serially connected switching matrices. Each matrix comprises at least one thyristor, which conducts current therethrough when triggered, and means for initially limiting inrush current through the thyristor when it begins conducting. Separate main triggering means are provided associated with each switching matrix for rendering the thyristor(s) of that matrix conductive. The main triggering means are normally operative in unison for simultaneously providing trigger signals to the thyristor(s) of their associated matrix.

In accordance with my invention, auxiliary triggering means are associated with the current limiting means of each matrix. Each auxiliary triggering means is operative for providing trigger signals to the thyristors of another matrix, in response to the commencement of current flowing through the current limiting means of the matrix with which the auxiliary triggering means is associated, irrespective of whether or not the main triggering means associated with that other matrix has provided trigger signals thereto.

BRIEF DESCRIPTION OF THE DRAWING

This invention will be better understood and its various objects and advantages will be more fully appreciated from the following description taken in conjunction with the accompanying drawings in which.

DESCRIPTION OF THE PREFERRED EMBODIMENT

Figure 1:
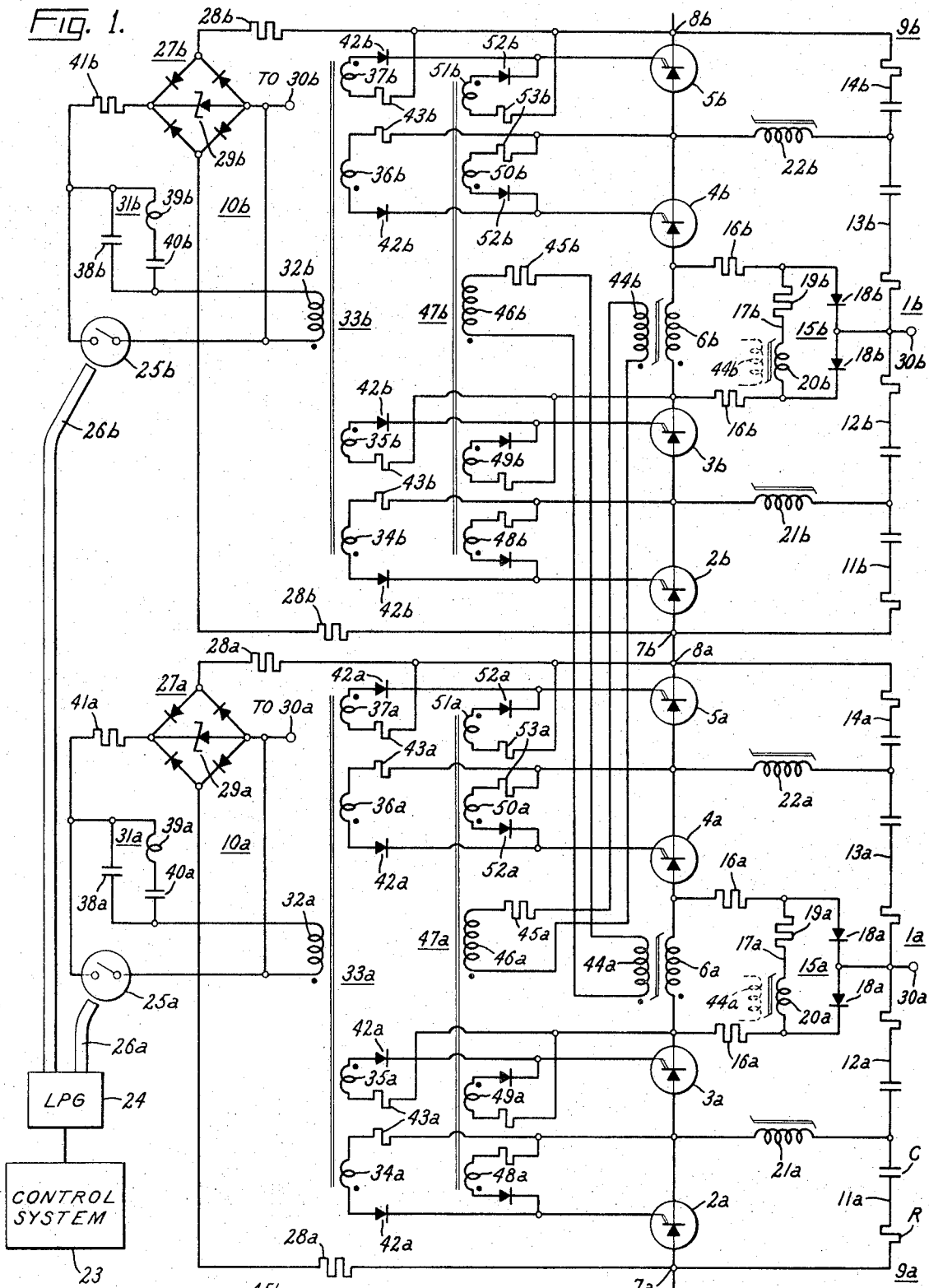
FIG. 1 is a schematic diagram.

The drawing shows a pair of switching matrices 1a and 1b which are connected together to form a valve of a high voltage electrical converter. Certain features of those matrices are shown and claimed in my above noted U.S. Patent and copending application and as such form no part of my instant invention. Although the exemplary valve shown comprises two of such matrices it should be noted that, depending upon the desired rating of the valve, any number of such matrices can be utilized.

Matrix 1a is seen to comprise a plurality of thyristor sections, 2a, 3a, 4a and 5a connected in series with a main saturable core inductor 6a between main anode and cathode terminals 7a and 8a respectively. Similarly matrix 1b comprises a plurality of thyristor section 2b, 3b, 4b and 5b connected in series with a main saturable core inductor 6b between the main anode and cathode terminals 7b and 8b. The cathode terminal 8a of matrix 1a is connected to the anode terminal 7b of matrix 1b so that matrix 1a is connected in series with matrix 1b and thus terminals 7a and 8b form the main terminals of the valve.

Each of the serially interconnected thyristor sections 2a through 5a of matrix 1a and 2b through 5b of matrix 1b comprises at least one high-power SCR. Such solid state devices were discussed in the introductory portion of this specification. To insure steady state and transient voltage sharing among the respective sections of the matrices these sections are shunted by respective R-C bypass networks 9a and 9b as shown. The SCR's in the four thyristor sections are arranged to permit conventional current to pass through the matrix in an upward direction between valve terminals 7a and 8b as viewed in the drawing when they are all triggered to forward conducting states.

Where the current rating desired for the matrix exceeds the forward current rating of a single SCR, each thyristor section can be formed by connecting two or more of these elements in parallel with one another inside a common housing, or by electrically paralleling physically separate SCR's. In such a parallel array the respective elements or devices should be selected to turn on in unison and to conduct substantially equal shares of the whole matrix current. It will therefore be apparent to those skilled in the art that the singular rectifier symbol with dual gates depicting each of the thyristor sections 1a through 5a and 2b through 5b is intended to represent an extra high current array of SCR's capable of contemporaneous switching from forward blocking states to substantially equi-conducting states.

To condition the matrix for through current conduction, the SCR's in the respective thyristor sections of matrix 1a are simultaneously triggered or fired by a main triggering circuit 10a. Similarly the SCR's in the thyristor sections of matrix 1b are fired by main triggering circuit 10b. Although simultaneously triggered, some of the sections in a matrix may nevertheless respond slightly faster than others. In this event the voltage dividing bypass network associated with that matrix enables the turn-on process successfully to proceed until even the slowest section thereof has attained a forward conducting state. As can be seen bypass network 9a, comprises four series resistor-capacitor subcircuits 11a, 12a, 13a and 14a connected across the four thyristor sections 2a, 3a, 4a and 5a, respectively. Similarly bypass network 9b comprises four subcircuits 11b, 12b, 13b and 14b. Each subcircuit comprises a resistor in series with a capacitor. For example subcircuit 11a consists of resistor R and capacitor C. More information about the details and operation of the bypass networks can be found in my above noted patent application.

In an electric valve made up of a plurality of serially connected matrices, like that shown, it is possible that individual matrices comprising the valve will not switch simultaneously with one another. In this event the main inductor 6a that is provided in matrix 1a and main inductor 6b that is provided in matrix 1b serve the important purpose of temporarily absorbing the matrix voltage and consequently preserving the desired voltage division among the matrices when one matrix switches on slightly ahead of the other matrix. Further, these inductors serve to limit inrush current when the matrices become conductive.

A commutation transient suppressing circuit is provided coupled to the main inductor of each switching matrix to protect the thyristors of the matrix when said matrix initially begins conducting. This circuit is denoted as transient suppressing circuit 15a and is provided in shunt with inductor 6a of matrix 1a. A similar transient suppressing circuit 15b is provided in shunt with the main inductor 6b of matrix 1b. Circuit 15a comprises a pair of resistors 16a, a resistor-inductor subcircuit 17a and a pair of diodes 18b. Resistor-inductor subcircuit 17a comprises a resistor 19a in series with an auxiliary inductor, 20a, having a saturable core. Similarly resistor-inductor subcircuit 17b comprises a resistor 19b in series with an auxiliary inductor 20b, having a saturable core. The auxiliary inductors like main inductors 6a and 6b also serve to limit inrush current through the matrix when it becomes conductive. More information about the details and operation of the commutation transient suppressing circuits can be found in my above noted patent and patent application, wherein such circuits are shown and claimed.

In order to prevent excess voltage from being applied to one thyristor section of a matrix if an immediately adjacent thyristor section were to fail (i.e., act as a short circuit) additional saturable core inductors are provided in each switching matrix. For example, an additional saturable core inductor 21a is connected between the common junction of bypass circuits 11a and 12a and the common junction of thyristor sections 2a and 3a. A similar saturable core inductor 22a is connected between the common junction of bypass circuits 13a and 14a and the common junction of thyristor sections 4a and 5a. Saturable core inductors 21b and 22b are similarly arranged in matrix 1b. More information about the details and operation of these additional inductors can be found in my above noted copending application, wherein said inductors are shown and claimed.

The means for firing the valve into conduction comprises a suitable control system 23 for cyclically triggering a light pulse generator 24 at any desired firing angle. The firing angle of a valve is the time at which a valve is fired measured in electrical degrees from the cyclically recurring instant at which its anode first becomes positive with respect to its cathode. The light pulse generator 24 includes a common source of light for a plurality of light activated control means that are respectively associated with the plurality (i.e., matrices comprising one valve. As shown, the main triggering means, 10a, associated with matrix 1a includes one such light activated control means, namely 25a, while the main triggering means, 10b, associated with matrix 1b includes another such light activated control means, 25b. The light signal from the common light source is transmitted to the light activated control means 25a and 25b via respective light guides 26a and 26b.

Main triggering means 10a and 10b are arranged to simultaneously apply firing signals to the gates of the thyristor sections of their associated matrices in response to the reception of a light signal via respective guides 26a and 26b.

Each of the main triggering means are energized by the voltage across their associated matrix. To that end a single phase rectifier bridge 27a is connected via a pair of current limiting resistors 28a to the anode and cathode terminals 7a and 8a, respectively, of matrix 1a and a single phase rectifier bridge 27b is connected via a pair of current limiting resistors 28b to the anode and cathode terminals 7b and 8b, respectively, of matrix 1b. A voltage regulating zener diode 29a is connected between the positive and negative D-C terminals of bridge 27a and the latter terminal is connected directly to the midpoint 30a of bypass network 9a. Similarly, a voltage regulating zener diode 29b is connected in bridge 27b and the negative D-C terminal of this bridge is connected to the midpoint 30b of bypass network 9b.

The D-C voltage from rectifier 27a supplies a pulse shaping circuit comprising the light activated control means 25a in parallel with the series combination of an L-C subcircuit 31a and a primary winding 32a of a pulse transformer 33a having four secondary windings 34a, 35a, 36a and 37a. The L-C subcircuit 31a comprises a first capacitor 38a shunted by an inductor 39a in series with a second capacitor 40a. A resistor 41a is connected between the pulse shaping circuit and the positive D-C terminal of bridge 27a. Similarly, the D-C voltage from rectifier 27b supplies the pulse shaping circuit of main triggering means 10b. That circuit comprises subcircuit 31b consisting of capacitors 38a and 40b and inductor 39b and primary winding 32b of the pulse transformer 33b.

This transformer 33b includes four secondaries, namely 34b, 35b, 36b and 37b. A resistor 41b is connected between the positive D-C terminal of bridge 27b and the pulse shaping circuit.

With the above arrangement, the light activated control means 25a and 25b of the respective main triggering means 10a and 10b are normally open whereupon capacitors 38a and 40a are charged by the D-C voltage derived by the rectifier 27a from the voltage appearing across the matrix 1a during its non-conducting interval and capacitors 38b and 40b are charged by the D-C voltage derived by the rectifier 27b from the voltage appearing across the matrix 1b during its non-conducting interval. Upon receiving simultaneous light signals from the light pulse generator 24, via the light guides 26a and 26b, the light activated control means 25a and 25b momentarily close to provide a low resistance path for capacitor discharge current. In main triggering means 10a this path includes the transformer primary 32a, and thus steep wave front control signals of proper polarity, magnitude and duration are induced in secondaries 34a – 37a. These signals are conductively coupled by means including diodes 42a and resistors 43a to the gate-cathode circuits of thyristor sections 2a – 5a in matrix 1a, and the SCR's comprising these sections are consequently triggered to forward conducting states. In main triggering means 10b the capacitor discharge path includes the transformer primary 32b, and thus steep wave front control signals are induced in secondaries 34b – 37b. These signals are conductively coupled via diodes 42a and resistors 43b to the gate circuits of thyristor sections 2b – 5b in matrix 1b. Accordingly, in response to the generation of a light signal by light pulse generator 24, main triggering circuits 10a and 10b normally operate in unison to simultaneously trigger the SCR's of their associated matrices into conduction.

In the valve triggering system shown herein, if there is no provision for redundant triggering of the switching matrices forming the valve, in the event of a malfunction in either of the main triggering circuits (wherein the SCR's in a switching matrix are not triggered when desired), the entire valve may remain in a blocking state notwithstanding that the SCR's of the matrix provided with trigger signals would be conductive. Furthermore, damage to the non-triggered SCR's may result from the voltage imposed thereon when the SCR's of the triggered matrix begin conducting since the main saturable core reactor in the conducting matrix will only support its matrix voltage for a short period of time. In order to avoid such problems I have provided novel redundant triggering means for the valve triggering system.

My redundant triggering scheme is relatively simple and reliable in that it utilizes the voltage appearing across the saturable core inductors in a matrix whose thyristor sections are conducting current to provide trigger signals for the thyristor sections of another matrix whose thyristor sections may or may not have been triggered into conduction. To this end I provide an auxiliary triggering means comprising an additional winding 44a disposed about the saturable core of main inductor 6a of matrix 1a. This winding is connected in series through a current limiting resistor 45b having four secondaries, namely, 48b, 49b, 50b and 51b. Another auxiliary triggering means is provided comprising an additional winding 44b which is disposed about the saturable core of main inductor 6b of matrix 1b. This winding is connected in series through a current limiting resistor 45a to the primary winding 46a of another transformer 47a having four secondaries, namely 48a, 49a, 50a and 51a. It is desirable that the values of current limiting resistors 45a and 45b be relatively high so as not to unnecessarily load associated main inductors 6a and 6b since such loading would reduce their current limiting effectiveness.

The operation of my invention is as follows: when the valve, composed of matrices 1a and 1b, is in its blocking state the voltage appearing between its anode and cathode terminals 7a and 8b, respectively, is equally divided among those matrices by their associated bypass networks. The capacitors in the bypass subcircuits are charged at this time. Upon a command from the control system 23 the light pulse generator 24 provides a light signal, which is transmitted via the light guides 26a and 26b to main triggering means 10a for matrix 1a and to main triggering means 10b for matrix 1b. As was previously noted both of said triggering means are normally operative in unison for simultaneously triggering the thyristor sections of their associated matrix into conduction. Once a thyristor section is triggered into conduction the capacitor in its associated bypass network subcircuit begins discharging. When all of the valves' thyristor sections are conducting, load current is enabled to flow through the valve from the anode terminal 7a to the cathode terminal 8b.

If for some reason one of the main triggering means 10a, 10b fails to provide trigger signals to the SCR's of its associated matrix when called upon to do so, the auxiliary triggering means of my redundant firing scheme will, nevertheless, provide trigger signals to those SCR's. For example, it shall be assumed that in response to a light signal, main triggering means 10a provides trigger signals to the SCR's of matrix 1a but main triggering means 10b fails to provide trigger signals to the SCR's of matrix 1b. In such an event the SCR's of thyristor sections 2a – 5a are triggered into conduction whereupon the capacitors of their respective bypass subcircuits 11a – 14a begin discharging therethrough and through main inductor 6a. The voltage existing across these capacitors then appears across inductor 6a. Further, these capacitors act as an energy source. Since auxiliary winding 44a is inductively coupled to inductor 6a, a voltage signal is induced in winding 44a, in response to the rising voltage across inductor 6a. This induced voltage signal is conductively coupled via current limiting resistor 45b to the primary winding 46b of transformer 47b, whereupon trigger signals are induced in its secondaries 48b – 51b and are conductively coupled through diodes 52b and resistors 53b to the gate-cathode circuits of the respective thyristor sections 2b – 5b. The capacitors of bypass circuits 11a – 14a thus provide an energy source inductively coupled through main inductor 6a and transformer 47b to supply the required gate current for thyristor sections 2b – 5b. Once triggered, the SCR's of these thyristor sections begin conducting. Since the SCR's of thyristor sections 2a – 5 a have been rendered conductive by main triggering means 10a, load current conduction through the valve (between terminals 7a and 8b) commences.

It should be noted that trigger signals are provided to the SCR's of thyristor sections 2b – 5b via my auxiliary triggering means when current begins flowing through inductor 6a (i.e., when thyristor sections 2a – 5a begin conducting) irrespective of whether or not the main triggering means 10b for matrix 1b has provided trigger signals to the SCR's of its thyristor sections 2b – 5b. In a similar manner the SCR's of matrix 1a are provided with trigger signals from secondary windings 48a – 51a of transformer 47a and via diodes 52a and resistors 53a when current begins flowing through inductor 6b (i.e., when thyristor sections 2b – 5b begin conducting) irrespective of whether or not the main triggering means 10a for matrix 1a has provided trigger signals to the SCR's of its thyristor sections 2a – 5a.

As was previously noted the values of the current limiting resistors 45a and 45b are preferably of relatively high impedance to minimize the loading of their associated main inductors 6a and 6b. The result of such a construction is that if the valve is fired at a relatively small firing angle when there is low anode-to-cathode voltage on the matrix, the high impedance of the resistors 45a and 45b may limit the flow of current therethrough to such an extent that effective redundant trigger signals may not be produced by transformers 47a and 47b.

Figure 2:
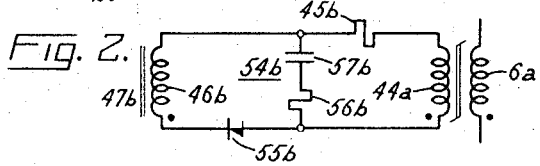
FIG. 2 is a schematic diagram of a portion of the circuit shown in FIG. 1.

In order to ensure that redundant triggering occurs properly irrespective of the firing angle of the valve, the means shown in FIG. 2 can be coupled to the current limiting resistor in each of the auxiliary triggering means. In this figure, means 54b is shown connected to transformer 47b and current limiting resistor 45b. Similar means, not shown, are connected to the transformer 47a and the current limiting resistor 45a. Means 54b comprises a four layer diode 55b or the like (e.g., a Schockley diode) connected in series with windings 46b and 44a, a resistor 56b having one end connected to the common point of diode 55b and winding 44a and a capacitor 57b connected between the other end of the resistor 56b and the current limiting resistor 45b.

The function of means 54b is to store up electric energy resulting from the flow of current through main inductor 6a, which energy is provided thereto via inductively coupled winding 44a, and to quickly release that energy through the primary winding 46b when a preselected amount of energy has been stored so that effective redundant trigger signals are produced thereby. To that end capacitor 57b is charged through current limiting resistor 45b and resistor 56b from winding 44a. Once the voltage on the capacitor 57b reaches the breakdown point of four layer diode 55b that diode quickly switches to a low-resistance conductive state whereupon capacitor 57b begins discharging current rapidly through it, resistor 56b and primary winding 46b. The value or resistor 56b is low relative to resistor 45b so that the magnitude of the discharging capacitor current flowing through the primary winding 46b is sufficient to ensure that effective redundant trigger signals are produced. The valve of the capacitor 57b should be such that it will charge up to the diode's breakdown voltage prior to saturation of inductor 6a.

When the valve is fired at a large firing angle (e.g., 20°) the anode to cathode voltage on each of its matrices is relatively high. This relatively high matrix voltage appears across main matrix inductor 6a when current begins flowing therethrough. A portion of this voltage is coupled via inductor 6a to resistor 56b. That voltage portion is of sufficient magnitude to cause diode 55b to commence conducting immediately, whereupon redundant trigger signals are produced immediately. In contradistinction, when the valve is fired at a small firing angle (e.g., less than 5°) there is some small delay (on the order of 50 microseconds) before redundant trigger signals are produced. This occurs because the relatively small voltage then appearing on main inductor 6a is insufficient to cause the diode 57 to begin conducting immediately due to the voltage dividing action of resistors 45b and 56b. However, when the capacitor 57b has charged up to the diodes' breakdown voltage the diode commences conducting and redundant trigger signals are produced. During the delay period the portion of the voltage of matrix 1a not supported by its main inductor 6a is switched onto matrix 1b. Nevertheless, no danger is presented in such an occurrence due to the fact that the voltage switched to matrix 1b from any conducting matrix is necessarily low since the available anode-to-cathode voltage on each matrix is low when the valve is fired at small firing angles. Accordingly, the provision of means 54b in the redundant firing circuit, while introducing some delay before the production of redundant trigger signals at small firing angles, nevertheless, insures that effective redundant signals are produced without impairment of the current limiting function of the main inductors.

Owing to the fact that auxiliary inductors 20a and 20b are normally smaller than main inductors 6a and 6b (the reason for this construction is considered in my above noted patent application), in the interests of economy, a relatively small winding 44a (shown in phantom lines) may be disposed about the core of the auxiliary inductor 20a in lieu of a relatively large winding 44a disposed about main inductor 6a. Similarly a relatively small winding 44b (shown in phantom lines) may be disposed about the core of the auxiliary inductor 20b in lieu of a relatively large winding 44b disposed about main inductor 6b. Such a redundant triggering scheme arrangement will operate in the same manner as the previously discussed arrangement. Although the latter arrangement may be desirable from an economic standpoint it, nevertheless, sacrifices some operating reliability by providing somewhat weaker redundant-trigger-signals than are provided by the former arrangement. This can be appreciated when one considers that upon initial current conduction through a matrix, the main inductor therein supports a somewhat greater voltage across itself than does the auxiliary inductor, since the latter is connected in series with plural damping resistors.

While I have shown and described the preferred from of may invention, many modifications will occur to those skilled in the art, without departing from my invention in its broader aspects. For example, amplifier means may be utilized to amplify the voltage signal induced in the winding coupled to the current limiting inductor. Furthermore, transformers 47a and 47b may not be necessary if windings 46a and 46b are utilized as additional primaries for main transformers 33a and 33b, whereupon the redundant trigger signals are supplied to the matrices via their respective secondaries 34a – 37a and 34b – 37b. With such an arrangement diodes would be required in series with primaries 46a and 46b. I therefore intend to cover all such changes and modifications as fall within the true scope and spirit of my invention.

What I claim as new and desire to secure by Letters Patent of the United States is:

1. In a high voltage electric valve comprising first and second serially connected switching matrices and first and second triggering means respectively associated therewith, each of said matrices comprising at least one thyristor, which conducts current therethrough when supplied with a trigger signal from the triggering means associated with its matrix, a main inductor connected in series with said thyristor, and an auxiliary inductor connected in series with resistance means to form a transient suppressing subcircuit connected in shunt with said main inductor, said first and second triggering means being normally operative in unison to provide simultaneous trigger signals for all of the thyristors of said matrices, the improvement comprising: first auxiliary triggering means magnetically coupled to the auxiliary inductor of said first matrix and operative in response to the commencement of current flowing therethrough for providing a triggering signal to the thyristor of said second matrix irrespective of whether or not the second triggering means is operating, and second auxiliary triggering means magnetically coupled to the auxiliary inductor of said second matrix and operative in response to the commencement of current flowing therethrough for providing a triggering signal to the thyristor of said first matrix irrespective of whether or not the first triggering means is operating.

2. In a high voltage electric valve comprising first and second serially connected switching matrices and first and second triggering means respectively associated therewith, each of said matrices comprising at least one thyristor, which conducts current therethrough when supplied with a trigger signal from the triggering means associated with its matrix, and means for initially limiting inrush current through said thyristor when it begins conducting, said triggering means being normally operative in unison to provide simultaneous trigger signals for all of the thyristors of said matrices, the improvement comprising: first auxiliary triggering means associated with the current limiting means of said first matrix and operative in response to the commencement of current flowing therethrough, for providing a triggering signal to the thyristor of said second matrix irrespective of whether or not the second triggering means is operating, and second auxiliary triggering means associated with the current limiting means of said second matrix and operative in response to the commencement of current flowing therethrough for providing a triggering signal to the thyristor of the first matrix irrespective of whether or not the first triggering means is operating, each of said first and second auxiliary triggering means comprising energy storage means, means for supplying energy to said energy storing means from the current flowing through the associated current limiting means, and means operative when a preselected amount of energy has been stored in said storage means for rapidly releasing said energy to provide said triggering signals.

3. The electric valve as specified in claim 2 wherein said energy storage means comprises a capacitor and wherein said last mentioned means comprises a four layer diode.

* * * * *